US005111093A

United States Patent [19]

Tanaka

[11] Patent Number: 5,111,093

[45] Date of Patent: May 5, 1992

[54] ENGINE STARTER WITH DUST SEAL ARRANGEMENT

[75] Inventor: Toshinori Tanaka, Himeji, Japan

[73] Assignee: Mitsubishi Denki K.K., Tokyo, Japan

[21] Appl. No.: 574,181

[22] Filed: Aug. 29, 1990

[30] Foreign Application Priority Data

Aug. 31, 1989 [JP] Japan .................................. 1-223077

[51] Int. Cl.[5] ..................... H02K 7/118; F02N 15/06; F16J 15/32

[52] U.S. Cl. ....................................... 310/88; 74/7 A; 277/152; 310/83

[58] Field of Search .............. 74/7 A, 7 R; 290/38 R, 290/48; 310/83, 88, 90; 384/130, 147; 277/152, 205

[56] References Cited

U.S. PATENT DOCUMENTS

| | | | |
|---|---|---|---|
| 2,626,839 | 1/1953 | Creson et al. | 384/147 |
| 3,439,963 | 4/1969 | Hein et al. | 384/147 |
| 3,772,921 | 11/1973 | Carlson et al. | 74/7 A |
| 4,690,414 | 9/1987 | Haaland | 277/205 |
| 4,895,035 | 1/1990 | Okamoto et al. | 277/152 |
| 4,929,857 | 5/1990 | Isozumi | 310/83 |
| 4,995,275 | 2/1991 | Okamoto et al. | 74/7 A |

FOREIGN PATENT DOCUMENTS

| | | | |
|---|---|---|---|
| 63-56141 | 3/1988 | Japan | 310/88 |

OTHER PUBLICATIONS

Marlin-Rockwell, "Flange Type Seals for Ball and Roller Bearing Applications", *Product Engineering*, 11-48, pp. 122-123.

*Primary Examiner*—Steven L. Stephan
*Assistant Examiner*—D. L. Rebsch
*Attorney, Agent, or Firm*—Sughrue, Mion, Zinn Macpeak & Seas

[57] ABSTRACT

An engine starter for an internal combustion engine having an engine ring gear, comprising a pinion gear (8) axially slidable on the rotary shaft (3) between an actuated position in which the pinion gear (8) engages the engine ring gear through the housing opening (6) and an inactuated position in which the pinion disengages from the ring gear. The starter conventionally also comprises a unidirectional clutch (14) for unidirectionally transmitting a rotation of the rotary shaft (3) to the pinion gear (8), and a solenoid switch (18) for energizing the motor (2) and driving the pinion (8) between the actuated and the inactuated positions. A first dust seal ring (22) having a forwardly extending lip (24) between the rotary shaft (3) and the pinion (8) seals therebetween against ingress of any foreign matter. To receive the seal ring (22), the pinion (8) may have an annular cavity (25) or groove so that the lip's inner edge slidably contacts the rotary shaft (3). A second dust seal ring (27) may be disposed between the housing (1) and a cylindrical outer surface of the pinion gear (8) or a unidirectional clutch (14). A third dust seal ring (30) may also be disposed at the front end of the rotary shaft (3) for protecting a bearing surface from dust.

11 Claims, 4 Drawing Sheets

ENGINE STARTER WITH DUST SEAL ARRANGEMENT

BACKGROUND OF THE INVENTION

This invention relates to an engine starter and, more particularly, to an engine starter having a pinion gear engageable with an engine ring gear of an internal combustion engine for starting it.

FIG. 1 illustrates one example of a conventional engine starter to which the present invention pertains. In FIG. 1, the engine starter comprises a housing 1 having contained therein an electric motor 2 having a rotary shaft 3 rotatably supported by sleeve bearings 4 mounted in the housing 1. The front end (the right-hand end in the figure) of the rotary shaft 3 is supported by a nose cone 5 of the housing 1 through the bearing 4. The nose cone 5 defines therein a substantially cylindrical space and has formed in its wall an opening 6 for the purpose which will become apparent later.

The engine starter also comprises a pinion gear 8 rotatably and axially slidably mounted on the rotary shaft 3 through a sleeve bearing 9. The pinion gear 8 is slidable along the rotary shaft 3 between an inactuated position illustrated in FIG. 1 in which the pinion gear 8 is rearwardly positioned and disengaged from an engine ring gear (not shown) and an actuated position in which the pinion gear 8 is moved forward and engages the engine ring gear (not shown) through the opening 6 in the housing 1. The pinion gear 8 has a cylindrical outer surface 10 which is surrounded by the cylindrical wall of the nose cone 5 of the housing 1 and defines an annular space 11 therebetween.

In order to unidirectionally transmit a rotation of the rotary shaft 3 to the pinion gear 8, a unidirectional clutch 14 is disposed behind the pinion gear 8 to mechanically couple between the pinion gear 8 and the rotary shaft 3. The unidirectional clutch 14 is slidable on the rotary shaft 3 and mechanically connected to the pinion gear 8 so that they move together in the axial direction. The unidirectional clutch 14 has a substantially cylindrical outer surface 15 which also is surrounded by the cylindrical wall of the nose cone 5 and an annular space 16 is defined therebetween.

The engine starter further comprises an electromagnetic unit 18 including a solenoid switch 19 for selectively energizing the dc electric motor 2 and for electromagnetically driving the pinion gear 8 together with the unidirectional clutch 14 between the forward, actuated position and the rearward, inactuated position through a shift lever 20.

With the conventional engine starter as above described, undesirable foreign matter such as dust and particles can easily enter into the interior of the nose cone 5 of the housing 1 through the opening 6. The foreign matter entered into the housing nose cone 5 are often caught between the bearing surfaces between the rotary shaft 3 and the bearing 4, degrading smooth sliding and rotary movements of the pinion gear 8. The foreign matter may also enter into the dc motor 2 or even into the switch unit of the solenoid switch 19 through the annular clearances 11 and 16 defined around the cylindrical outer surfaces 10 and 15 of the pinion gear 8 and the unidirectional clutch 14, respectively. Such foreign matter may prevent the dc motor 2 and the switch 19 from properly operating. They also may damage the motor 2 and the solenoid switch 19. The foreign matter may also enter into the bearing surface between the rotary shaft 3 and the front bearing 4.

SUMMARY OF THE INVENTION

Accordingly, one object of the present invention is to provide an engine starter free from the above-discussed problems.

Another object of the present invention is to provide an engine starter with a dust seal arrangement in which ingress of any foreign matter into the clearance between the sliding surfaces is prevented.

A further object of the present invention is to provide an engine starter in which ingress of any foreign matter into the sleeve bearing is prevented.

Still another object of the present invention is to provide an engine starter in which ingress of any foreign matter into the dc electric motor is prevented.

With the above objects in view, according to the present invention, the engine starter for use with an internal combustion engine having an engine ring gear comprises a housing having an opening, an electric motor having a rotary shaft rotatably disposed within the housing and a pinion gear rotatably mounted on the rotary shaft. The pinion gear is axially slidable along the rotary shaft between an actuated position in which the pinion gear is positioned forward and engages the engine ring gear through the opening in the housing and an inactuated position in which the pinion gear is moved rearward and disengages from the engine ring gear. A unidirectional clutch is disposed between the pinion gear and the rotary shaft for unidirectionally transmitting a rotation of the rotary shaft to the pinion gear, and a solenoid switch unit is provided for electromagnetically driving the pinion gear between the actuated position and the inactuated position and for controlling energization of the electric motor. A first dust seal ring having a forwardly extending lip is disposed between the rotary shaft and the pinion for sealing therebetween against ingress of any foreign matter thereinto. To receive the seal ring, the pinion may have an annular cavity or groove so that the lip's inner edge slidably contacts the rotary shaft. A second dust seal ring may be disposed between the housing and a cylindrical outer surface of the pinion gear or alternatively a unidirectional clutch axially movable with the pinion gear. A third dust seal ring may be disposed at the front end of the rotary shaft for protect a bearing from dust.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 2:
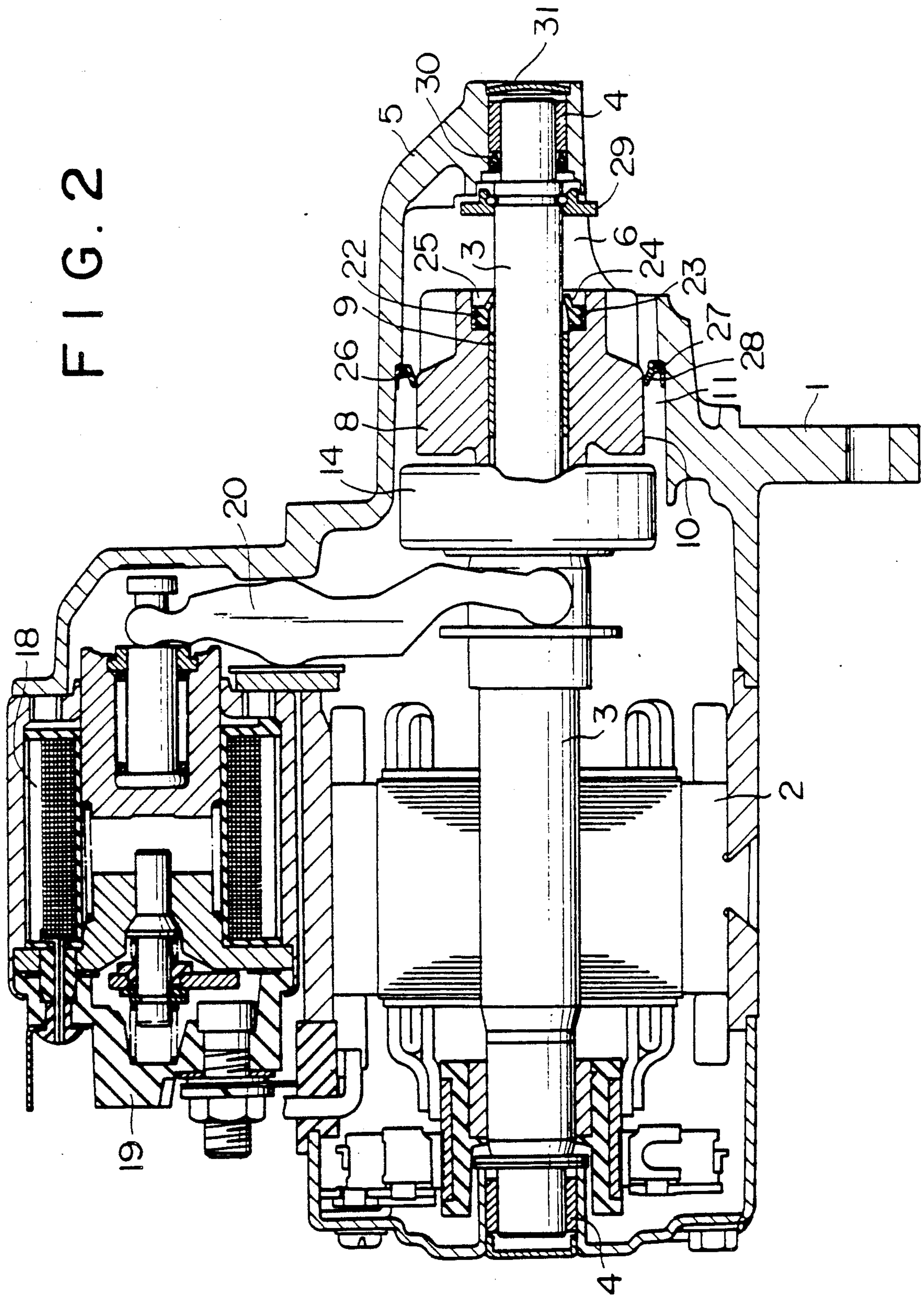
FIG. 2 is a sectional side view of an engine starter constructed in accordance with the teachings of the present invention.

FIG. 2 illustrates one embodiment of an engine starter of the present invention, the engine starter comprising a housing 1 containing an electric motor 2 having a rotary shaft 3 rotatably supported by sleeve bearings 4 mounted in the housing 1. The front end (the right-hand end in the figure) of the rotary shaft 3 is supported by a nose cone 5 of the housing 1 through the bearing 4. The nose cone 5 defines therein a substantially cylindrical space and has formed in its wall an opening 6 for the purpose which will become apparent later.

Figure 1:
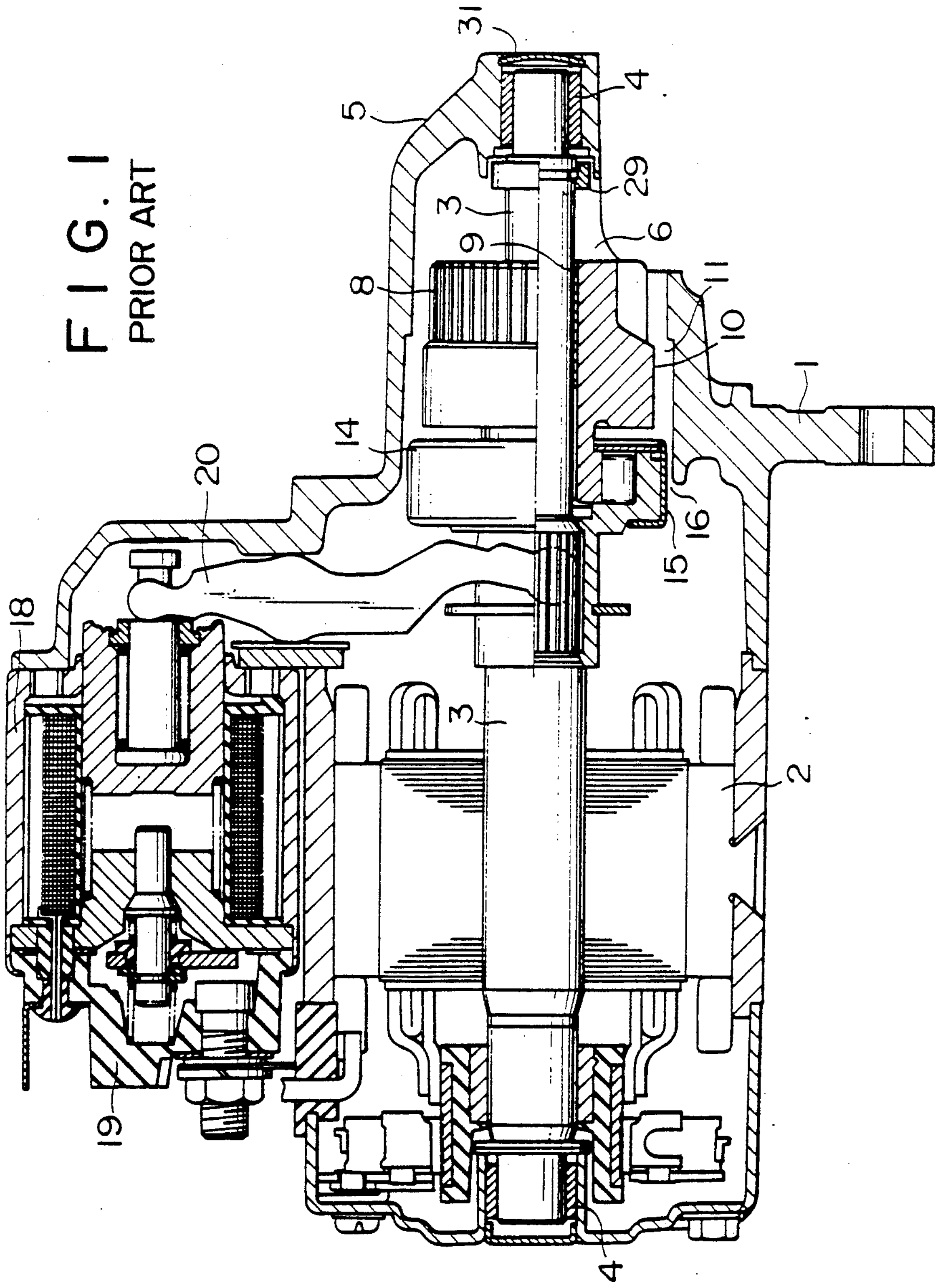
FIG. 1 PRIOR ART
FIG. 1 is a sectional side view of a conventional engine starter.

The engine starter also comprises a pinion gear 8 rotatably and axially slidably mounted on the rotary shaft 3 through a sleeve bearing 9. The pinion gear 8 is slidable along the rotary shaft 3 between an inactuated position illustrated in FIG. 1 in which the pinion gear 8 is rearwardly positioned and disengaged from an engine ring gear (not shown) and an actuated position in which the pinion gear 8 is moved forward and engages the engine ring gear (not shown) through the opening 6 in the housing 1. The pinion gear 8 has a cylindrical outer surface 10 which is surrounded by the cylindrical wall of the nose cone 5 of the housing 1 and defines an annular space 11 therebetween.

In order to unidirectionally transmit a rotation of the rotary shaft 3 to the pinion gear 8, a unidirectional clutch 14 is disposed behind the pinion gear 8 to mechanically couple the pinion gear 8 and the rotary shaft 3. The unidirectional clutch 14 is slidable on the rotary shaft 3 and mechanically connected to the pinion gear 8 so that they move together in the axial direction. The unidirectional clutch 14 has a substantially cylindrical outer surface 15 which also is surrounded by the cylindrical wall of the nose cone 5 and an annular space 16 is defined therebetween.

The engine starter also comprises an electromagnetic unit 18 including a solenoid switch 19 for selectively energizing the dc electric motor 2 and for electromagnetically driving the pinion gear 8 together with the unidirectional clutch 14 between the forward, actuated position and the rearward, inactuated position through a shift lever 20.

According to the present invention, the engine starter further comprises a first dust seal ring 22 disposed between the rotary shaft 3 and the pinion gear 8 and in front of the sleeve bearing 9 for sealing the bearing surface therebetween against ingress of any foreign matter which may come into this area through the opening formed in the housing 1. The dust seal ring 22 may be made of a known elastic seal material. In the illustrated embodiment, the first dust seal ring 22 comprises a ring-shaped main body 23 of substantially rectangular cross-section and an annular lip 24 extending from the main body 23. The main body 23 has an inner diameter larger than the outer diameter of the rotary shaft 3 but the annular lip 24 has an inner diameter smaller than the outer diameter of the rotary shaft 3 so that the inner hem of the lip 24 elastically contacts the outer surface of the rotary shaft 3 with the lip 24 extending diagonally in the substantially forward and inward direction when the dust seal ring 22 is place in position between the pinion gear 8 and the rotary shaft 3.

In order to fit the dust seal ring 22 in the pinion gear 8, an annular cavity 25 or recess is provided in the inner cylindrical surface of the pinion gear 8. In the embodiment illustrated in FIG. 2, the cavity 25 is a stepped, enlarged portion of the central bore of the pinion gear 8 formed at the front end of the gear 8, so that the cavity 25 is open at its front side. It is to be noted that the main body 23 of the dust seal ring 22 may be secured by any known means to the inner surface of the cavity 25, and that the lip 24 inwardly extends from the cavity 25 to elastically touch the outer surface of the rotary shaft 3 but the lip 24 is within the cavity 25 in the axial direction and does not extend beyond the front end of the pinion gear 8.

Since the sliding bearing surface between the inner surface of the sleeve bearing 9 and the outer surface of the rotary shaft 3 is protected against the entry of the foreign matter by the first dust seal ring 22, no foreign matter is allowed to enter into the clearance between the rotary shaft 3 and the sleeve bearing 9. When the pinion gear 8 is moved axially along the rotary shaft 3, the lip 24 of the dust seal ring 22 scrapes or wipes the outer surface of the shaft 3 as it is moved with the pinion, thereby cleaning the rotary shaft 3. When the pinion gear 8 abuts against the stop ring 29, the dust scraped and collected is received within the cavity 25, eliminating the possibility that the collected dust is forcedly pushed under the lip 24 of the dust seal ring 22.

It is also seen that a second dust seal ring 26 is disposed between the housing 1 and the cylindrical outer surface 10 of the pinion gear 8 for sealing the annular space 11 defined therebetween against ingress of any foreign matter. The second dust seal ring 26 is attached to the stepped inner cylindrical surface of the nose cone 5 of the housing 1 at its outer diameter portion 27. The second dust seal ring may be attached by a suitable known measure. The seal ring 26 has a lip 28 extending inwardly and rearwardly from the housing 1 so that its inner hem is elastically brought in a sliding contact with the cylindrical outer surface 10 of the pinion gear 8.

A third dust seal ring 30 is disposed between the sleeve bearing 4 supported by the housing nose cone 5 and the rotary shaft 3 for sealing therebetween against ingress of any foreign matter thereinto. The third dust seal ring 30 is mounted behind the sleeve bearing 4 and in front of a stop ring 29 so that the bearing surface between the shaft 3 and the bearing 4 is protected by the seal ring 30 against foreign matter comming into this area through the opening 6. The other side or the front end of the sleeve bearing 4 is sealed by a seal plate 31.

Figure 3:
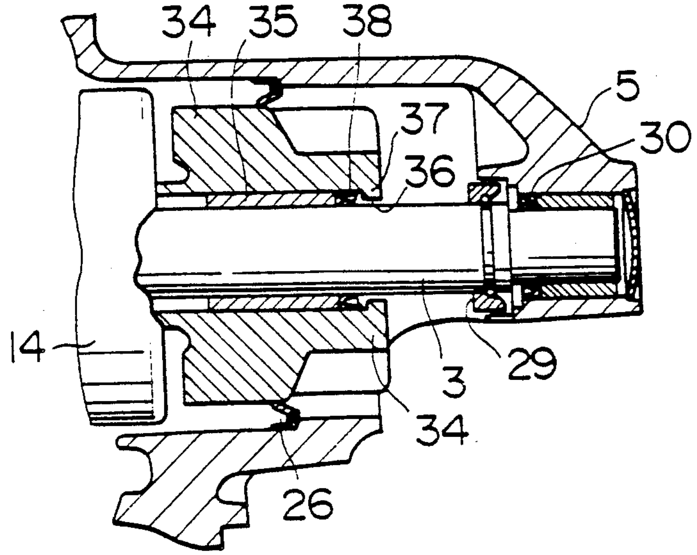
FIG. 3 is a fragmental sectional side view of an engine starter with a modified dust seal arrangement of another embodiment of the present invention.

FIG. 3 illustrates a modification of the dust seal arrangement between the rotary shaft 3 and the pinion gear 34, in which a sleeve bearing 35 between the pinion gear 34 and the rotary shaft 3 is relatively thick and an annular cavity 36 is defined between a front end face of the sleeve bearing 35, the inner cylindrical surface of the pinion gear 34 and an annular inward ridge 37 extending from the front end of the pinion gear 34, whereby the cavity 36 is substantially closed at its front side. A first dust seal ring 38 is disposed within the cavity 36.

Figure 4:
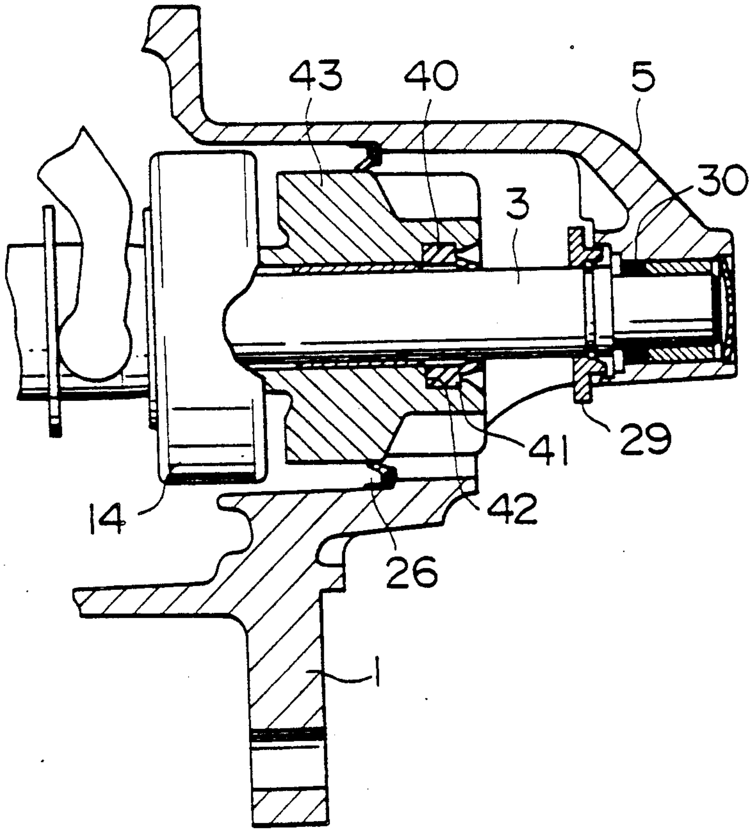
FIG. 4 is a fragmental sectional side view of an engine starter of another embodiment of the present invention illustrating another dust seal arrangement.

FIG. 4 illustrates another modification of the dust seal arrangement in which a first dust seal ring 40 made of an elastic material is elastically fitted at its main body 41 within an annular cavity 42 or a groove defined between two side walls. The dust seal ring 40 is formed as a single-piece member, and the inner corner of the front end of the pinion gear 43 is bevelled for easy insertion of the seal ring 40 into the cavity 42.

Figure 5:
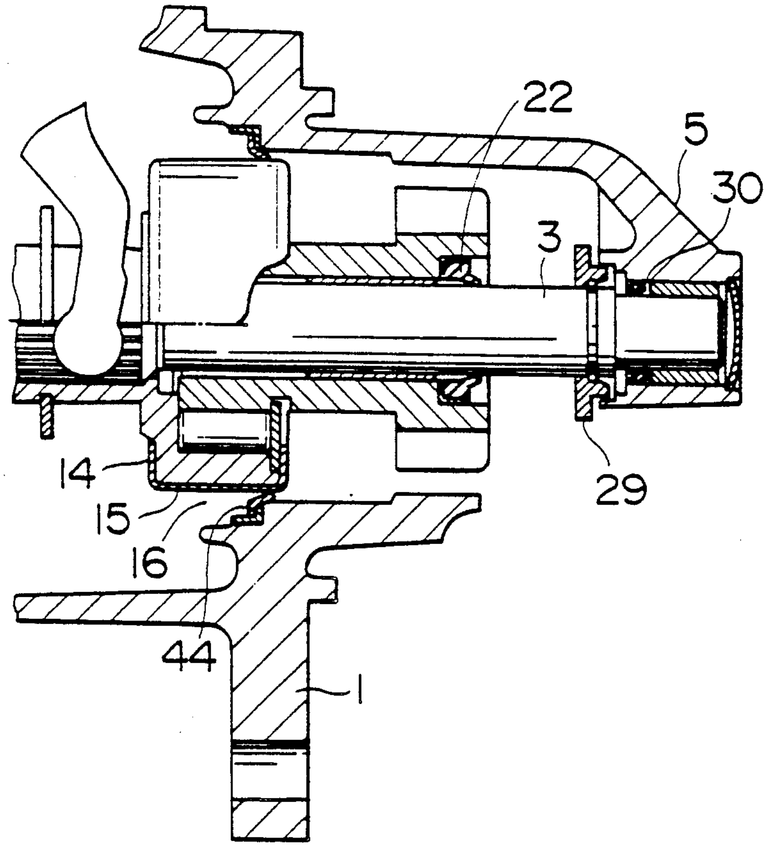
FIG. 5 is a fragmental sectional side view of an engine starter of still another embodiment of the present invention illustrating a further dust seal arrangement.

FIG. 5 illustrates still another modification of the dust seal arrangement, in which the annular space 16 defined between the housing 1 and the cylindrical outer surface 15 of the unidirectional clutch 14 is sealed by a second dust seal ring 44 against ingress of any foreign matter into the interior of the electric motor. The second dust seal ring 44 is attached to the inner cylindrical surface of the housing nose cone 5 with its inner edge brought into an elastic, sliding contact with the cylindrical outer surface 15 of the unidirectional clutch 14.

What is claimed is:

1. An engine starter for use with an internal combustion engine having an engine ring gear, comprising:

- a housing having an opening:
- an electric motor having a rotary shaft rotatably disposed within said housing;
- a pinion gear rotatably mounted on said rotary shaft, said pinion gear being axially slidable along said rotary shaft between an actuated position in which said pinion gear is moved forward and engages the engine ring gear through said opening in said housing and an inactuated position in which said pinion gear is moved rearward and disengages from the engine ring gear;
- a unidirectional clutch disposed between said pinion gear and said rotary shaft for unidirectionally transmitting a rotation of said rotary shaft to said pinion gear;
- electromagnetic drive means for electromagnetically driving said pinion gear between said actuated position and said inactuated position and controlling energization of said electric motor; and
- seal means disposed between said rotary shaft and said pinion gear for sealing therebetween against ingress of any foreign matter thereinto, said seal means comprising a seal ring having a lip extending substantially forwardly and inwardly such that an inner edge thereof contacts an outer surface of said rotary shaft.

2. An engine starter as claimed in claim 1, wherein said seal means comprises a dust seal ring.

3. An engine starter as claimed in claim 1, wherein said unidirectional clutch is axially movable together with said pinion gear, said unidirectional clutch having a substantially cylindrical outer surface, and wherein said engine starter further comprises a second dust seal means disposed between said housing and said cylindrical outer surface of said unidirectional clutch for sealing therebetween against ingress of any foreign matter thereinto.

4. An engine starter as claimed in claim 1, wherein said pinion gear has an annular cavity in which said seal

5. An engine starter as claimed in claim 4, wherein said annular cavity is open at its front side.

6. An engine starter as claimed in claim 4, wherein said annular cavity is substantially closed at its front side.

7. An engine starter as claimed in claim 4, wherein said pinion gear comprises an annular groove defined between at least two side walls.

8. An engine starter as claimed in claim 1. wherein said pinion gear has a substantially cylindrical outer surface, said engine starter further comprising a second dust seal means disposed between said housing and said cylindrical outer surface of said pinion gear for sealing therebetween against ingress of any foreign matter.

9. An engine starter as claimed in claim 8, wherein said second dust seal means is attached to said housing and its inner edge is in sliding contact with said cylindrical outer surface of said pinion gear.

10. An engine starter as claimed in claim 3, wherein said second dust seal means is attached to said housing with its inner edge brought into sliding contact with said cylindrical outer surface of said unidirectional clutch.

11. An engine starter as claimed in claim 1, further comprising a third dust seal means disposed at the front end of said rotary shaft between said housing and said rotary shaft for sealing therebetween against ingress of any foreign matter thereinto.

* * * * *